United States Patent [19]

Bieler et al.

[11] 4,104,404

[45] Aug. 1, 1978

[54] CROSS-LINKED AMIDE/OLEFIN POLYMERIC TUBULAR FILM COEXTRUDED LAMINATES

[75] Inventors: Anne C. Bieler, Greenville; Henry G. Schirmer, Spartanburg, both of S.C.

[73] Assignee: W. R. Grace & Co., Duncan, S.C.

[21] Appl. No.: 689,440

[22] Filed: May 24, 1976

Related U.S. Application Data

[62] Division of Ser. No. 556,755, Mar. 10, 1975, Pat. No. 3,997,383.

[51] Int. Cl.² .............................................. B65D 85/30
[52] U.S. Cl. ..................................... 428/35; 428/420; 428/474; 428/516; 428/520; 426/118; 426/127
[58] Field of Search ................. 428/35, 420, 474, 516, 428/520

[56] References Cited

U.S. PATENT DOCUMENTS

| | | | |
|---|---|---|---|
| 2,936,261 | 5/1960 | Cole | 428/516 |
| 3,423,231 | 1/1969 | Lutzmann | 428/474 |
| 3,496,061 | 2/1970 | Freshour et al. | 428/516 X |
| 3,617,419 | 11/1971 | Fischer | 428/516 X |
| 3,697,368 | 10/1972 | Bhuta et al. | 428/474 |
| 3,832,265 | 8/1974 | Denommee | 428/251 |
| 3,912,843 | 10/1975 | Brazier | 428/474 |
| 3,997,383 | 12/1976 | Bieler et al. | 428/516 |

*Primary Examiner*—P. C. Ives
*Attorney, Agent, or Firm*—John J. Toney; William D. Lee, Jr.; John B. Hardaway

[57] ABSTRACT

An amide/olefin polymeric film laminate suitable for packaging, water cooking, and storing food within the package is prepared by coextruding polyamide and polyolefin layers to form a laminate and then cross-linking the laminate by irradiation. Prior art polyolefin/polyamide laminates delaminate readily when subjected to agitation in hot water, but this tendency is significantly reduced by laminates according to the present invention.

5 Claims, No Drawings

CROSS-LINKED AMIDE/OLEFIN POLYMERIC TUBULAR FILM COEXTRUDED LAMINATES

This is a division of application Ser. No. 556,755, filed Mar. 10, 1975, now U.S. Pat. No. 3,997,383, which issued on Dec. 14, 1976.

FIELD OF THE INVENTION

This invention relates to laminated films in tubular and sheet configurations for packaging, cooking, and storing food. Particularly, the invention relates to laminates having polyamide and polyolefin layers, specifically nylon and polyethylene layers.

BACKGROUND OF THE INVENTION

Laminates of nylon and polyethylene are widely used for packaging various products and have been found especially suitable for foodstuff containing packages such as bags or pouches subjected to widely varying temperatures and conditions. Nylon is used for such packages because it is an oxygen barrier, has a high melting point, and is strong and clear. Polyethylene is used as an inner surface for such laminates because it is easily heat sealable, is moisture impermeable, and is relatively chemically inert to many food stuffs.

The disadvantages of nylon are principally its high cost, moisture permeability, and poor heat sealability; but, these disadvantages are largely offset by polyethylene's low cost, low moisture permeability, and good heat sealability. While the complimentary characteristics of nylon and polyethylene make them suitable for use as laminates, especially for packages containing food, the materials are somewhat incompatible because they are considerably difficult to initially bond together. This difficulty is thought to be attributable to their differences in physical and chemical structures. Also, once joined, the two materials will often separate upon physical deformation, particularly when agitated at water cooking temperatures which generally range from 140° F upwardly.

A number of techniques have been developed in an attempt to overcome the bonding difficulties of nylon to polyethylene. These techniques include chemically and electrically treating the surface of the polyethylene and the incorporation of a layer of adhesive between the nylon and polyethylene. Some of the adhesives used in the prior art are ethylene-acrylic acid copolymers and the zinc or magnesium neutralized ionic copolymers known as ionomers. Even blends of an ionomer and polyethylene have been used in an attempt to find an adhesive that maintains sufficient cohesion in hot water or at boiling water temperatures. However, in an elevated temperature medium such as hot or boiling water, pouches, bags, and clipped casings of bulk packaged food, particularly packages containing more than ten pounds of food, all fail because the amide/olefin polymeric laminates tend to delaminate and shred within a short period of time. Accordingly, it is a principal object of the present invention to provide an amide/olefin polymeric laminate which will not delaminate under physical deformation at elevated temperatures.

It is another object of this invention to provide a laminated film in tubular or casing form which is suitable for packaging foodstuffs.

In is another object of the subject invention to provide a package in which food may be both cooked and stored without opening the package between the cooking and storing phases.

These and other objects are accomplished by the invention which is described herein below.

SUMMARY OF THE INVENTION

It has been surprisingly discovered that delamination of a polyolefin/polyamide laminate may be prevented and the strength of the laminate increased by irradiating the laminate to a dosage level of at least 6 MR. Accordingly, in one aspect, this invention is a method of making a laminate which will resist delamination and shredding in an elevated temperature medium. First, the laminate is formed by coextruding an amide polymer and an olefin polymer with an adhesive having cross-linkable monomeric units disposed therebetween. The adhesive is preferably composed predominately of olefin units. Next, the coextruded laminate is cross-linked by ionizing radiation in the dosage range of 6 to 10 MR. Higher dosages could be used but are not necessary and are uneconomical.

In another aspect, the invention is a method of producing an olefin/amide laminate for prolonged use in elevated temperature media in which the method comprises the steps of: coextruding a tubular laminate having polyamide and irradiatively cross-linkable polyolefin layers with an adhesive disposed between the polyolefin and polyamide layers, the major component of the adhesive being olefin units which are cross-linkable by radiation; cooling and flattening the tubular laminate; and, irradiating the laminate by ionizing radiation to a dosage level in the range of 6 to 10 MR.

In still another aspect, the present invention is a laminated film which comprises a polyamide layer; a polyolefin layer; an adhesive disposed between said polyamide and polyolefin layers, the major component of the adhesive being olefin units; and, the laminate being cross-linked to the equivalent of an irradiation dosage in the range of 6 to 10 MR.

Preferably, the olefin is ethylene so that the preferred polyolefin layer is polyethylene and the preferred adhesive is an ionomer in which ethylene is the predominate monomeric unit. Also, within the scope of the invention the polyolefin layer may be an ethylene vinyl acetate copolymer and the adhesive may comprise an acid copolymer resin.

DEFINITIONS

As used herein the terms set forth below will be understood to have the following meanings:

"Polymer" includes homopolymers, polymers, copolymers, terpolymers, and block, graft, random, or alternating polymers.

"Ionomer" means a polymer which has ethylene as its major component but has both covalent and ionic bonds. The anions hang from the hydrocarbon chain and the cations are metallic, e.g. magnesium or zinc so that ionomers may sometimes be referred to as a zinc neutralized ionic copolymer.

"Adhesive" means a polymeric substance capable of bonding two polymeric film layers together and for this application specifically refers to resins comprising ionomers and blends thereof with polyolefins and to acid copolymer resins and blends thereof with polyolefin resins.

"Amide" or "amide polymer" means a nylon selected from the group consisting of polycaproamide, polyhexamethylene, adipamide, polyhexamethylene sebacamide, polycaprylamide, polyundecanoamide, and polydodecanamide. These nylons are respectively commonly known as nylon-6, nylon-6, 6; nylon 6, 10; nylon 8; nylon 11; and nylon 12 with the preferred nylon being nylon-6 such as type 8207 which is sold by Allied Chemical Corporation.

"Olefin" means the group of unsaturated hydrocarbons of the general formula $C_nH_{2n}$ and includes ethylene, propylene, butene-1, etc., and blends thereof. In the present application the olefins of interest are the mono-alpha olefins having 2 to 8 carbon atoms and which cross-link when exposed to ionizing radiation.

"Irradiation" means exposure to high energy radiation such as electrons, X-rays, gamma rays, beta rays, etc. which induce cross-linking between the molecules of the irradiated material. Preferably, irradiation are carried out by an electron accelerator and the dosage levels is determined by the insoluble gel in the irradiated material. The dosage is measured in "rads" wherein one rad is the absorbed dose of ionizing radiation equal to an energy of 100 ergs per gram of irradiated material. A megarad (MR) is one million rads.

DETAILED DESCRIPTION OF THE INVENTION

In a preferred embodiment of the present invention a tubular casing which is 10 inches wide in the flattened condition and which has a 4.5 mil thickness was manufactured by a coextrusion process. A coextrusion die fed by four extruders divided the melt streams into ten separate layers. Beginning from the inside of the tube, the first two layers were polyethylene having a density of 0.92 gms./cc. These two layers were fed from a 3½ inch Hartig extruder and the two layers had a combined extruded thickness of 1.2 mils. Next to the inner polyethylene layers was the first adhesive layer with the adhesive being an ionomer resin fed from a 1½ inch MPM extruder and the thickness of the first adhesive layer was 0.3 mils. Following the adhesive layer were four layers of nylon coextruded from a 2 inches NRM extruder and the total finished thickness of these four layers was 1.5 mils. Adjacent to the nylon layers was a second adhesive layer fed from the same extruder as the first layer and having the same thickness of 0.3 mils. The outer two layers were the same polyethylene as the first two layers except that the die for the outer two layers was fed from a 1¾ inch Prodex extruder and the total thickness of these two layers was 1.2 mils.

The polyethylene and the ionomer were products of E. I. du Pont de Nemours & Co. of Wilmington, Delaware, the polyethylene being PE-2650 and the ionomer being Surlyn 1650. The nylon resin was nylon 6, type 8207 from Allied Chemical Corp. of Morristown, N.J.

The complete laminate has a structure as follows: polyethylene/polyethylene/ionomer/nylon/nylon/nylon/nylon/ionomer/polyethylene/polyethylene.

Thus, considering the four central nylon layers as sublayers forming one unit layer, the unit layer has adhesive on either side and to the respective adhesive layers are applied the polyethylene unit layers which consist of sublayers. In this instance, one polyethylene layer forms the inner surface of the tubing and one of the other polyethylene layers forms the outer surface of the tubing.

EXAMPLE 1

Multilayer tubings as described immediately above were irradiated to different dosage levels and then each tubing was cut into 5 tubular sections or casings and one end of each casing was closed with a U-shaped metal clip. Each casing was then filled with 1 cup vegatable oil and 5 quarts of water, closed with a clip, and tumbled in water at 190° F. The tumbling was accomplished by placing the filled casings in a modified, front loading, commercial laundry machine which was filled with the heated water. Placing the casings, in the water initially cooled the water to about 172° F. After about 20 minutes the water again reached 190° F and agitation began with the following results:

TABLE I

| Irradiation Dosage (MR) | Time at 190° F in Minutes | | | | |
| --- | --- | --- | --- | --- | --- |
| | 10 min. | 20 min. | 30 min. | 40 min. | 50 min. |
| 0 | Slight delam. | PE layer Comp. delam. | PE layer Comp. delam. | PE layer Comp. delam. | PE layer Comp. delam. |
| 2 | Very slight delam. | Slight delam. | PE layer Comp. delam. | PE layer Comp. delam. | PE layer Comp. delam. |
| 4 | Very slight delam. | Very slight delam. | Very slight delam. | Slight delam. | PE layer Comp. delam. |
| 6 | No delam. | No delam. | No delam. | No delam. | No delam. |
| 8 | No delam. | No delam. | No delam. | No delam. | No delam. |

EXAMPLE 2

A portion of the preferred tubing was irradiated to a dosage of approximately 8 MR and then both irradiated and nonirradiated tubing was cut in 30 inch lengths and closed at one end with a U-shaped metal clip to form a casing. The casings were then filled with three representative products, these being (1) a mixture of 20% vegetable oil with water as it was known that the ionomer/polyethylene bond is weakened by fatty substances; (2) creamed carrots; (3) macaroni and cheese. All of the casings were hand filled with five quarts of the test product and sealed with a clip after expressing excess air by hand. A modified laundry machine of the horizontal rotating drum, front loading type with a capacity of 125 lbs. was equipped with a steam injector and thermostat and was filled with 50 gallons of tap water. The casings were then subjected to agitated tumbling at 210° F for 20 minutes. Afterwards the interior layers of the casings were examined for delamination and shredding and then microscopically examined. The results were as follows:

TABLE II

| SAMPLE | NUMBER OF CASINGS | PRODUCT | EVALUATION |
| --- | --- | --- | --- |
| Irradiated | 3 | Oil & Water | Intact |
| Unirradiated | 3 | Oil & Water | Delamination & Shredding |
| Irradiated | 2 | Creamed Carrots | Intact |
| Unirradiated | 2 | Creamed Carrots | Delamination & Shredding |

TABLE II-continued

| SAMPLE | NUMBER OF CASINGS | PRODUCT | EVALUATION |
| --- | --- | --- | --- |
| Irradiated | 1 | Mac. & Cheese | Intact |
| Unirradiated | 1 | Mac. & Cheese | Delamination & Shredding |

In both Examples 1 and 2 when the dosage level was greater than 6 MR, none of the irradiated casings failed under these abusive test conditions whereas all of the unirradiated casings either delaminated or shredded or both and even the lower dosage level casings delaminated somewhat.

The practical significance of a test like the foregoing is that in certain institutional food cooking processes it has been discovered that food products may be cooked in casings and, after cooling, the food may be stored unfrozen at a temperature in the range of 28° F to 32° F. In these institutional cooking processes, it has been found quite advantageous to tumble the filled casings in heated water thus increasing the transfer of heat into the food product within the casing and thereby reducing the cooking time. In like manner, after cooking, the food may be rapidly cooled to its storage temperature by tumbling and agitation in cooled water. By making it possible for the temperature of the food to be reduced quickly from its cooking temperature to its storage temperature the growth of microorganisms can be effectively restricted thus increasing the storage lifetime of the food and enhancing its quality. The irradiated casings according to the present invention are the only thermoplastic packaging materials which have been found to be satisfactory for the above described cooking and storage process.

A commercial electron accelerator was the radiation unit used to irradiate the polyethylene/nylon/polyethylene laminate described hereinabove, and it was found that it was necessary to irradiate the laminate to a dosage of at least 6 MR. Increased dosage levels could be used but would be uneconomical as no increase in resistance to delamination and shredding was observed for the higher dosage levels. The increased abuse resistance and resistance to delamination is thought to be possibly due to irradiation induced cross-linking at and across the polyethylene/ionomer interface and the ionomer/nylon interface as there is some comingling of the melts in the coextruded laminate, to increased melting temperature of the cross-linked adhesive, and to increased strength in the polyethylene layers because of cross-linking. However, this invention is not limited to any particular theory explaining the increased resistance to delamination.

Besides the low density polyethylene (0.92 gms/cc) used in the laminate described in Examples 1 and 2, high density (0.96 gms/cc) polyethylene may be used as one or both of the polyethylene layers or an ethylene vinyl acetate copolymer may be used for one or both of the polyethylene layers.

Having described our invention,

The embodiments of the invention in which an exclusive property or privilege is claimed are defined as follows:

1. A coextruded, tubular, laminated polymeric film for use in elevated temperature media comprising:
    (a) a layer comprising a film-forming amide polymer;
    (b) a layer comprising a mono-alpha olefin polymer;
    (c) an adhesive disposed between said amide and olefin layers, said adhesive having mono-olefin units as the major component thereof;
    (d) said adhesive and said olefin polymer each being cross-linked by radiation to a dosage level of at least 6 MR.

2. The laminate of claim 1 wherein there is an olefin polymer layer on each side of said amine layer.

3. The laminate of claim 1 wherein said olefin layer is polyethylene.

4. The laminate of claim 1 wherein the olefin units in said adhesive are ethylene units.

5. The laminate of claim 1 wherein said polyamide layer comprises four sublayers and said polyolefin layers comprise two sublayers.

* * * * *